3,644,373
METHOD FOR THE PRODUCTION OF 3-SUBSTITUTED-1,2,3,4,5,6-HEXAHYDRO-6,11-DIMETHYL-8-HYDROXY-2,6-METHANO-3-BENZAZOCINES
Kazuo Kigasawa, Kawasaki, and Mineharu Hiiragi, Nagatoshi Wagatsuma, and Osamu Kusama, Tokyo, Japan, assignors to Grelan Pharmaceutical Co., Ltd., Tokyo, Japan
No Drawing. Filed Dec. 5, 1969, Ser. No. 882,734
Claims priority, application Japan, Dec. 6, 1968, 43/89,044
Int. Cl. C07d *39/00*
U.S. Cl. 260—293.54        14 Claims

ABSTRACT OF THE DISCLOSURE

A method for producing compounds of the formula

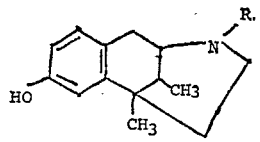

wherein R represents a member from the group of alkyl of up to 10 carbon atoms, cycloalkyl of 3 to 10 carbon atoms, cycloalkylalkyl of 4 to 10 carbon atoms and alkenyl of 2 to 10 carbon atoms, whereby a compound of the formula

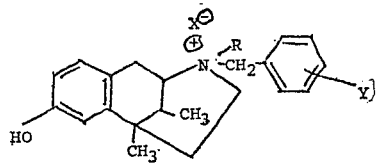

is reacted with thiophenoxide anion.

---

This invention relates to a new method for producing heterocyclic compounds. More concretely, the present invention is concerned with an improved method for producing 3-(alkyl or alkenyl) - 1,2,3,4,5,6-hexahydro-6,11-dimethyl - 8-hydroxy-2,6-methano-3-benzazocines represented by the Formula I:

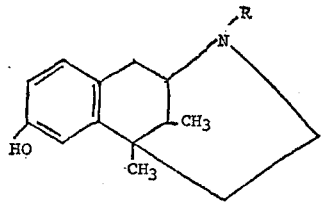

wherein R represents alkyl of up to 10 carbon atoms, cycloalkyl of 3 to 10 carbon atoms, cycloalkyl-alkyl of 4 to 10 carbon atoms and alkenyl of 2 to 10 carbon atoms.

It is well known that the compounds of the Formula I have analgesic activity and some of them have been marketed as analgesics (e.g. pentazocine:

$$R=-CH_2CH=C(CH_3)_2)$$

It was previously found by the present inventors that a 1,2,3,4,5,6 - hexahydro - 6,11-dimethyl-8-hydroxy-2,6-methano-3-benzazocine derivative of Formula I is produced by catalytic reduction of a quaternary ammonium salt of the Formula II:

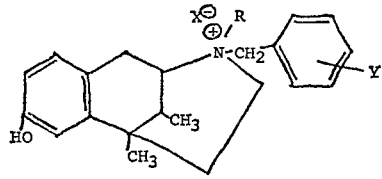

wherein X represents an anion; Y represents H or a halogen and R has the same meaning as defined above. Although the method certainly surpasses the other hitherto-known methods as the former requires fewer steps than the latter, there still remains room for improvement from the industrial point of view.

That is:

(1) The method requires an expensive catalyst such as palladium, nickel or platinum; and (2) In case where the hydrocarbon residue (R) contains one or more unsaturated bonds, there is concomitantly produced such a by-product saturated in the hydrocarbon residue that makes it difficult to purify the desired objective compound. It has now been found by the present inventors that a thiophenoxide anion has excellent properties of removing the benzyl group at the position 3 of the quaternary ammonium salt of Formula II to afford the objective compound of Formula I, rendering a neat reaction which results in easy purification as well as an elevated yield of the objective compound.

It is therefore the principal object of the present invention to provide a novel and industrially feasible method for producing the 3-(alkyl or alkenyl)-1,2,3,4,5,6-hexahydro - 6,11 - dimethyl-8-hydroxy-2,6-methano-3-benzazocines of Formula I with good yield in a pure state with low cost.

Said object is realized by reacting the quaternary ammonium salt of Formula II with thiophenoxide anion.

As regards the compounds of Formulae I and II, the group represented by R can be alkyl which is straight or branched having at most 10 carbon atoms, and is exemplified by methyl, ethyl, n-propyl, isopropyl, n-butyl, sec-butyl, tert-butyl, isobutyl, n-pentyl, n-hexyl, n-heptyl; or R is cycloalkyl of 3 to 10 carbon atoms exemplified by cyclobutyl, cyclopentyl, cyclohexyl; or R is cycloalkylalkyl of 4 to 10 carbon atoms exemplified by cyclopropylmethyl; or R is alkenyl of 2 to 10 carbon atoms exemplified by vinyl, 2,2-dimethylvinyl, 1-propenyl, allyl, cyclohexenyl, 3-methyl-2-butenyl, 1-pentenyl, 2-pentenyl, and the like. In the Formula II, the anion represented by X⁻ is exemplified by Br⁻, Cl⁻, I⁻ or OH⁻, and the halogen represented by Y includes chlorine, bromine and iodine.

The quaterinary ammonium salt to be employed as the starting material of the present invention is novel, and is easily prepared, for example, by reacting 3-(benzyl or halobenzyl)-1,2,3,4,5,6-hexahydro - 6,11 - dimethyl-8-hydroxy-2,6-methano-3-benzazocine (IV) with an alkylating or alkenylating agent (III): RX(III) wherein each of R and X has the same meaning as defined above) of which the alkyl or alkenyl is to be introduced into the 3-position of the final product of Formula I. For this preparation, it is recommended to use a suitable solvent such as methanol, ethanol, chloroform, dioxane, tetrahydrofuran, benzene, xylene or toluene so far as it does not affect the reaction adversely. The reaction is carried out at about 20° to 100° C. and is usually completed in about 1 to 48 hours.

The thiophenoxide anion as the other reactant in the process of the present invention is usually employed in the form of an alkali metal thiophenolate or thiophenol in combination with an alkali metal hydroxide. Alkali metal thiophenolate includes sodium thiophenolate and potassium thiophenolate, and the alkali metal hydroxide includes potassium hydroxide and sodium hydroxide.

While the amount of the thiophenoxide anion relative to the quaternary ammonium salt should vary with the type of the starting materials, the reaction temperature and the kind of the solvent, it is generally recommendable to employ about 1 to 20 gram ions, preferably about 3 to 10 gram ions, per gram mole of the quaternary ammonium salt.

The reaction of the present invention is generally carried out in a suitable solvent which does not disturb the reaction. The suitable solvents include water, alcohols (e.g. methanol, ethanol, propanol), ketones (e.g. acetone, methyl ethyl ketone), dioxane, acetic acid, ethyl acetate, chloroform, and the like. Of course, these solvents may be used in combination. While the reaction temperature should also vary with other reaction conditions, it usually falls in a range from about 30° to 120° C., more preferably from about 40° to 100° C.

After the reaction, the objective compound is recovered from the reaction mixture by per se known means, e.g. extraction, condensation, crystallization, recrystallization, chromatography, etc.

As the 3-(alkyl or alkenyl)-1,2,3,4,5,6-hexahydro-6,11-dimethyl-8-hydroxy-2,6-methano-3-benzazocine is a base, it can be converted to the corresponding acid addition salts by a conventional manner, e.g. by reacting the base with a mineral acid such as hydrochloric acid, sulfuric acid, hydrobromic acid, etc. or with an organic acid such as oxalic acid, fumaric acid, maleic acid, succinic acid, malonic acid, acetic acid, propionic acid, benzenesulfonic acid and the like.

Further explanation is given for the preparation of the starting material of Formula II or of the Formula IV shown below. These compounds may of course be prepared by any of per se known means, but it is particularly recommended to follow the following sequence of the reaction steps:

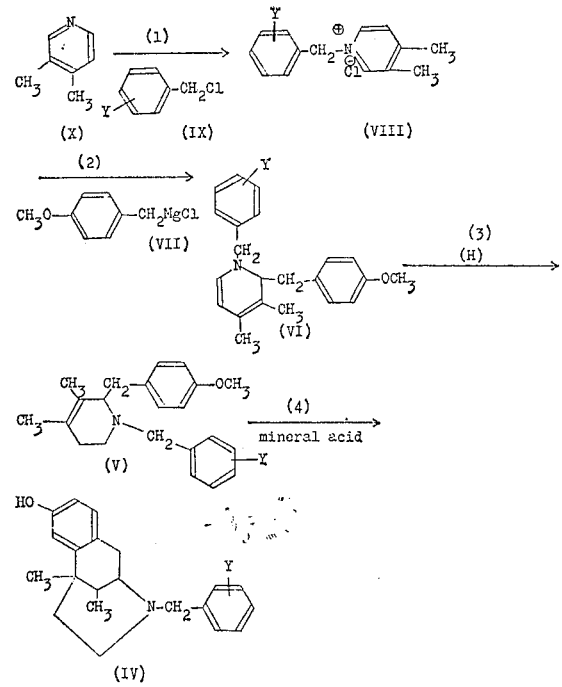

(wherein each of R, X and Y has the same meaning as defined above).

Step (1) is conducted by reacting 3,4-dimethylpyridine (X) with a benzyl chloride (IX), usually in a solvent such as methanol, ethanol, chloroform, dioxane, tetrahydrofuran, benzene, hexane or toluene, so far as it does not affect the reaction adversely. The reaction temperature is ordinarily about 20° C. to 100° C. The reaction time depends on other reaction conditions, but it is usually enough to conduct the reaction for about 1 to 48 hours for its completion. The reaction product, 1-(benzyl or halobenzyl)-3,4-dimethylpyridinium salt (VIII), can be recovered from the reaction mixture by any of per se known procedures, for example by collecting the precipitated crystals by filtration.

Step (2) is conducted by reacting the above produced pyridinium salt (VIII) with a Grignard reagent (VII) in a solvent which dissolves at least one of the reactants and which does not affect the reaction adversely, the most advantageously in an ether such as diethyl ether, dipropyl ether. The reaction is carried out at about room temperature or under moderate heating, and to keep anhydrous conditions gives a better result. The produced 1-(benzyl or halobenzyl)-2-(p-methoxy benzyl)-3,4-dimethyl-1,2-dihydropyridine (VI) may be recovered from the reaction mixture, e.g. after adjusting pH of the reaction mixture to about 7–10, by means of concentration and extraction or may be subjected to the next step without being recovered.

Step (3) is conducted by reducing the 1,2-dihydropyridine (VI) to the corresponding 1,2,5,6-terahydropyridine (V). For the conversion, any of per se known means for reducing a C—C double bond may be employed. Above all, such a specific reducing agent as sodium borohydride or the means of so-called catalytic reduction in the presence of a metal catalyst such as palladium, platinum or nickel are satisfactorily employed. More concretely the reaction is performed in a suitable solvent such as a lower alcohol (e.g. methanol, ethanol or propanol), an aqueous mixture of the lower alcohol or a mineral acid (e.g. hydrochloric acid or sulfuric acid) at about room temperature or under proper heating. The product, i.e. 1-(benzyl or halobenzyl)-2-(p-methoxybenzyl)-3,4 - dimethyl - 1,2,5,6 - tetrahydropyridine (V) may be recovered by a per se known procedure (e.g. concentration, adjusting the pH of the resulting reaction mixture, extraction, crystallization, distillation or chromatography) or may be submitted to the next reaction step.

Step (4) is conducted by reacting the compound (V) with a mineral acid (e.g. hydrogen bromide, hydrogen chloride, phosphoric acid or polyphosphoric acid) or its salt with a weak base such as an organic base (e.g. pyridine, dimethylaniline, triethylamine or trimethylamine). The reaction does not necessarily need a solvent, but is preferably conducted in a suitable solvent exemplified by a lower alcohol (e.g. ethanol or methanol) and an aqueous solution of the same. The amount of the mineral acid to be employed is preferably more than 3 mols per mol of the compound (V). The reaction is generally performed by heating, preferably at about 80° to 200° C. under either atmospheric pressure or in a pressure vessel and is completed in 3 to 24 hours. The product is recovered from the reaction mixture by a per se known procedure (e.g. by adjusting the pH of the reaction mixture, extraction, crystallization, recrystallization and filtration).

The above procedures for the preparation of the starting compounds are further explained below by way of an example. Hereinafter, the parts by weight bear the same relationship to parts by volume as do grams to milliliters.

1-benzyl-3,4-dimethylpyridinium chloride: 10 parts by weight of 3,4-dimethylpyridine and 11.8 parts by weight of benzyl chloride are dissolved in 15 parts by volume of dry benzene. The solution is refluxed for 3 hours to precipitate crystals, which are filtered and recrystallized from a mixture of acetone and ether to give 18.4 parts by weight (83.6%) of the product as needles melting at 156° to 158° C.

By the same manner as described above, 1-(p-chlorobenzyl)-3,4-dimethylpyridinium chloride melting at 178 to 181° C. is obtained (yield 85%).

1-benzyl-3,4-dimethyl-2-(p-methoxybenzyl)-1,2-dihydropyridine: To 40 parts by volume of an ethereal solution of p-methoxybenzylmagnesium chloride (prepared from 4.0 parts by weight of p-methoxybenzyl chloride), there is added 1.8 parts by weight of 1-benzyl-3,4-dimethylpyridinium chloride. The resulting solution is refluxed for 1.5 hours, and poured into 20 parts by weight of an aqueous solution containing 1.5 parts by weight of ammonium chloride. The mixture is made alkaline with 10% aqueous ammonia solution and extracted with ether. The ether layer is extracted with a 10% aqueous hydrogen chloride solution. The extract is alkalified with a 10% aqueous ammonium hydroxide solution and is extracted with ether. The ether layer is dried over potassium carbonate and then the ether is evaporated to leave 1.9 parts by weight of oily 1-benzyl-3,4-dimethyl-2-(p-methoxybenzyl)-1,2-dihydropyridine. This compound is so unstable that it is recommended to be immediately submitted to the next reaction.

By the same manner as described above, 1-(p-chlorobenzyl)-3,4-dimethyl-2-(p-methoxybenzyl)-1,2-dihydropyridine is produced (yield 92%).

1-benzyl-3,4-dimethyl-2-(p-methoxybenzyl-1,2,5,6-tetrahydropyridine: 0.1 part by weight of sodium hydroxide and 0.1 part by volume of water are dissolved in 50 parts by volume of methanol. To the solution is added 1.9 parts by weight of 1-benzyl-3,4-dimethyl-2-(p-methoxybenzyl)-1,2-dihydropyridine, followed by the addition of 0.2 part by weight of sodium boron hydride. The resulting solution is refluxed for 30 minutes, and the methanol is distilled off to leave a residue, which is then extracted with ether. The ether extract is dehydrated over potassium carbonate and subjected to distillation to remove the ether. The residue is further distilled in vacuo to obtain 1.1 parts by weight of 1-benzyl-3,4-dimethyl-2-(p-methoxybenzyl)-1,2,5,6-tetrahydropyridine as pale yellow oil boiling at 175° to 178° C. at 0.2 mm. Hg.

The compound is converted to the picrate, which is recrystallized from a mixture of ethanol and ether to give yellow granular crystals melting at 115° to 118° C.

By the same manner as described above, 1-(p-chlorobenzyl) - 3,4 - dimethyl - 2 - (p - methoxybenzyl)-1,2,5,6-tetrahydropyridine melting at 183 to 185° C. is obtained (yield 97%).

3-benzyl-1,2,3,4,5,6-hexahydro - 6,11 - dimethyl-8-hydroxy-2,6-methano - 3 - benzazocine: 1.1 parts by weight of 1-benzyl - 3,4 - dimethyl-2-(p-methoxybenzyl)-1,2,5,6-tetrahydropyridine is dissolved in 30 parts by volume of a 48% aqueous hydrobromic acid solution. The solution is refluxed for 19 hours. The reaction mixture is then made alkaline with a concentrated aqueous sodium hydroxide, solution, and extracted with ether. The ether layer is dried over potassium carbonate, and the ether is evaporated to leave a solid material. The solid material is submitted to a column chromatography, using 11 parts by weight of silicic acid. The column is eluted with 180 parts by volume of chloroform, and then with 80 parts by volume of a mixture of chloroform and methanol (95:5) to obtain, the elute, which is concentrated to dryness to give 0.55 part by weight of the solid product.

The product can be converted in a conventional manner into the corresponding hydrochloride melting at 268° to 270° C.

By the same manner as described above, 3-(p-chlorobenzyl)-1,2,3,4,5,6-hexahydro - 6,11 - dimethyl - 8 - hydroxy - 2,6 - methano-3-benzazocine is obtained (yield 72.7%).

The following examples will serve to illustrate the method of the present invention without limiting it thereto.

EXAMPLE 1

3.52 parts by weight of 3-benzyl-1,2,3,4,5,6-hexahydro-6,11-dimethyl - 8 - hydroxy-2,6-methano - 3 - benzazocine hydrochloride is treated with 10 parts by volume of 28% aqueous ammonium hydroxide solution, followed by extraction with ether to give 3.07 parts by weight of the corresponding free base. The base is dissolved in 50 parts by volume of methanol together with 7.1 parts by weight of methyl iodide, and the solution is refluxed for 2 hours. The solvent is distilled off, and the residue is washed with ether, whereupon 4.2 parts by weight of a solid precipitate is obtained. The precipitate is recrystallized from isopropanol to give 3.9 parts by weight of 3-benzyl-1,2,3,4,5,6-hexahydro - 3,6,11 - trimethyl - 8 - hydroxy-2,6-methano-3-benzazocinium iodide as a colorless powder melting at 217° to 218° C. (with decomposition).

Elementary analysis: $C_{22}H_{28}ONI$ (Molecular weight 449.394).—Calculated (percent): C, 58.80; H, 6.28; N, 3.12. Found (percent): C, 58.82; H, 6.68; N, 3.01.

Infrared absorption spectrum $$\nu_{max}^{KBr} \text{ cm.}^{-1}$$

3270 (OH); 1602 (benzene ring), 1590 (benzene ring), 765, 710 (5 hydrogen atoms on benzene ring).

4.5 parts by weight of the quaternary ammonium iodide prepared above is suspended in a mixture of 11.0 parts by weight of thiophenol and 80 parts by volume of 5% aqueous solution of sodium hydroxide, and the whole is heated on water bath at 40° to 50° C. for 5 hours with constant stirring. After cooling, 50 parts by volume of ether is added to the reaction mixture, which is extracted with 100 parts by volume of 10% aqueous hydrochloric acid. The acid extract is made alkaline with 28% aqueous ammonium hydroxide solution and, then, extracted with a few portions of chloroform, while salting out. The extracts are washed with water and dried over anhydrous sodium sulfate. The chloroform is distilled off to obtain 2.3 parts by volume of a colorless powder, which is then recrystallized from ethanol. The procedure yields 2.0 parts by weight of 1,2,3,4,5,6-hexahydro-3,6,11-trimethyl-8-hydroxy-2,6-methano-3-benzazocine as colorless needles melting at 229° to 232° C.

EXAMPLE 2

A suspension of 4.5 parts by weight of 3-benzyl-1,2,3,4,5,6-hexahydro - 3,6,11 - trimethyl-8-hydroxy-2,6-methano-3-benzazocinium iodide in a mixture of 11.0 parts by weight of thiophenol and 110 parts by volume of 5% aqueous solution of potassium hydroxide is heated on water bath at 80° to 90° C. for 10 hours, with constant stirring. After cooling, 50 parts by volume of ether is added to the reaction mixture, which is then treated in the same manner as Example 1, whereupon 2.5 parts by weight of a colorless powder is obtained. The powder is recrystallized from ethanol to obtain 2.2 parts by weight of colorless needles melting at 229°–232° C.

EXAMPLE 3

A solution of 2.5 parts by weight of 3-benzyl-1,2,3,4,5,6-hexahydro - 6,11 - dimethyl-8-hydroxy-2,6-methano-3-benzazocine and 0.11 part by weight of 3-methyl-2-butenyl bromide in 10 parts by volume of benzene is refluxed for 1 hour to give precipitates, which are filtered and recrystallized from a mixture of ethanol and ether to obtain 1.7 parts by weight of 3-benzyl-3-(3-methyl-2-butenyl)-1,2,3,4,5,6-hexahydro - 6,11 - dimethyl - 8 - hydroxy-2,6-methano-3-benzazocinium bromide as a colorless powder melting at 150° to 161° C. (with decomposition).

Elementary analysis: $C_{26}H_{34}ONBr \cdot H_2O$.—Calculated (percent). C, 65.81; H, 7.64; N, 2.95. Found (percent): C, 66.07; H, 7.51; N, 2.91.

Infrared absorptions $\nu_{max.}^{KBr}$ cm$^{-1}$ 3200 (OH), 3450 (H$_2$O), 1670 (C=C), 1615 (phenyl), 760 (5 hydrogen atoms on benzene ring), 720 (5 hydrogen atoms on benzene ring).

A suspension of 4.5 parts by weight of 3-benzyl-3-(3-methyl-2-butenyl) - 1,2,3,4,5,6 - hexahydro-6,11-dimethyl-8-hydroxy-2,6-methano-3-benzazocinium bromide in a mixture of 11.0 parts by weight of thiophenyl and 80 parts by volume of 5% aqueous sodium hydroxide solution is heated on water bath at 40° to 50° C. for 5 hours with constant stirring. After cooling, 50 parts by volume of ether is added to the reaction mixture, which is then extracted with 100 parts by volume of 10% aqueous hydrochloric acid. The acid extract is made alkaline with 28% aqueous ammonium hydroxide solution, followed by extraction with chloroform. The extract is washed with water and dried over anhydrous sodium sulfate. The chloroform is distilled off, and the white powdery residue is chromatographed on a column of 80 parts by weight of silicic acid. The column is eluted with 200 parts by volume of ether and, then, with 800 parts by volume of mixture of ether and chloroform (95:5). The second eluate is concentrated to recover 2.25 parts by weight of 3 - (3-methyl-2-butenyl)-1,2,3,4,5,6-hexahydro - 6,11-dimethyl-8-hydroxy-2,6-methano-3-benzazocine as a colorless powder melting at 146° C.

The infrared absorption spectrum, thin-layer chromatogram, nuclear magnetic resonance spectrum and ultraviolet absorption spectrum of the above product are in good agreement with those of the authentic sample.

EXAMPLE 4

After the manner described in Example 1, 0.27 part by weight of cyclopropylmethyl chloride is allowed to react with 0.31 part by weight of 3-benzyl-1,2,3,4,5,6-hexahydro - 6,11 - dimethyl-8-hydroxy - 2,6 - methano-3-benzazocine to give 0.52 part by weight of 3-benzyl-3 - cyclopropylmethyl - 1,2,3,4,5,6 - hexahydro-6,11-dimethyl-8-hydroxy-2,6-methano-3-benzazocinium chloride.

The quaternary ammonium chloride prepared above is submitted to the same procedures as in Example 1 to give 3-cyclopropylmethyl - 1,2,3,4,5,6 - hexahydro-6,11-dimethyl-8-hydroxy-2,6-methanol-3-benzoazocine as crystals melting at 201° C. The product is in accord with the authentic sample on the infrared absorption spectrum, thin-layer chromatogram and nuclear magnetic resonance spectrum.

EXAMPLE 5

A suspension of 4.5 parts by weight of 3-benzyl-3-(3-methyl-2-butenyl) - 1,2,3,4,5,6 - hexahydro-6,11-dimethyl-8-hydroxy-2,6-methano-3-benzazocinium bromide (which has been prepared by the same manner as described in Example 3) in a mixture of 11.0 parts by weight of thiophenol and 110 parts by volume of 5% aqueous potassium hydroxide solution is heated on water bath at 60° to 70° C. for 7 hours with constant stirring. After cooling, 50 parts by volume of ether is added to the reaction mixture, which is then extracted with 100 parts by volume of 10% aqueous hydrochloric acid. Thereafter, the procedure of Example 1 is followed to obtain 2.2 parts by weight of 3-(3-methyl-2-butenyl)-1,2,3,4,5,6-hexahydro-6,11-dimethyl-8-hydroxy-2,6-methanol-3-benzazocine as a colorless powder melting at 146° C.

EXAMPLE 6

A suspension of 2.2 parts by weight of 3-benzyl-3-(3-methyl-2-butenyl) - 1,2,3,4,5,6 - hexahydro-6,11-dimethyl-8-hydroxy-2,6-methano-3-benzazocinium bromide in a mixture of 6.0 parts by weight of thiophenol and 3.5 parts by volume of 10% aqueous potassium hydroxide solution is heated on water bath at 80°±5° C. for 5 hours with constant stirring. After cooling, 50 parts by volume of ether is added to the reaction mixture, which is then extracted with 10% aqueous hydrochloric acid. Thereafter, the procedure of Example 1 is followed to obtain 1.05 parts by weight of 3-(3-methyl-2-butenyl)-1,2,3,4, 5,6-hexahydro-6,11 - dimethyl - 8 - hydroxy-2,6-methano-3-benzazocine as a colorless powder melting at 146° C.

EXAMPLE 7

A mixture of 1.3 part by weight of 3-(p-chlorobenzyl)-3 - (3 - methyl - 2 - butenyl) - 1,2,3,4,5,6 - hexahydro-6,11 - dimethyl - 8 - hydroxy - 2,6 - methano - 3 - benzazocinum bromide, 2.9 parts by weight of thiophenol and 10.6 parts by volume of 5% sodium hydroxide aqueous solution is warmed on a water bath with stirring for 5 hours. After cooling, to the reaction mixture are added 100 parts by volume of 10% hydrochloric acid. Then 100 parts by volume of ether is added to the reaction mixture. After shaking the mixture vigourously, the aqueous layer is separated and is adjusted to be alkaline by 28% ammonium hydroxide aqueous solution. The resulting solution is extracted with chloroform. The chloroform layer is washed with water and dried with anhydrous sodium sulphate. Then chloroform is distilled off to give 0.85 part by weight of pale brown syrup. The compound is subjected to column chromatography on 16 parts by weight of silicic acid using firstly 240 parts by volume of ether and then 300 parts by volume of ether-chloroform (95:5) as eluant. The ether-chloroform eluate is collected and concentrated to give 5 parts by volume of 3-(3-methyl-2-butenyl)-1,2,3,4,5,6-hexahydro - 6,11 - dimethyl-8-hydroxy-2,6-methano-3-benzazocine as colorless powder.

The infrared absorption spectrum, thin layer chromatogram, nuclear magnetic resonance spectrum and ultraviolet absorption spectrum of the compound are in perfect agreement with those of 3-(3-methyl-2-butenyl)-1,2,3,4,5,6-hexahydro - 6,11 - dimethyl - 8 - hydroxy - 2,6 - methano-3-benzoazocine obtained by the method disclosed in Japanese publication No. 21,622/1965.

What is claimed is:

1. A method for producing a heterocyclic compound represented by the general formula:

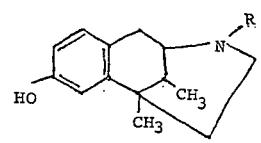

wherein R represents a member form the group of alkyl of up to 10 carbon atoms, cycloalkyl of 3 to 10 carbon atoms, cycloalkylalkyl of 4 to 10 carbon atoms and alkenyl of 2 to 10 carbon atoms, which comprises reacting a quaternary ammonium salt represented by the general formula:

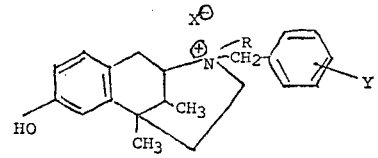

wherein

R has the same meaning as defined above,
Y is hydrogen or a halogen and
X$^\ominus$ is an anion, with thiophenoxide anion.

2. A method as claimed in claim 1, wherein R is 3-methyl-2-butenyl.

3. A method as claimed in claim 1, wherein R is cyclopropylmethyl.

4. A method as claimed in claim 1, wherein R is methyl.

5. A method as claimed in claim 1, wherein Y is hydrogen.

6. A method as claimed in claim 1, wherein Y is Cl at position 4 on the phenyl group.

7. A method as claimed in claim 1, wherein X is chlorine.

8. A method as claimed in claim 1, wherein X is bromine.

9. A method as claimed in claim 1, wherein X is iodine.

10. A method as claimed in claim 1, wherein the amount of thiophenoxide anion is about 1 to 20 gram ions per mol of the quaternary ammonium salt.

11. A quaternary ammonium compound of the formula,

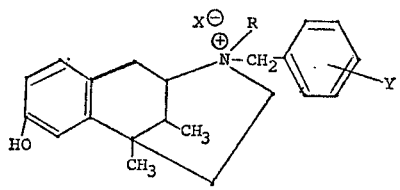

wherein R represents a member of the group of alkyl of up to 10 carbon atoms, cycloalkyl of 3 to 10 carbon atoms, cycloalkylalkyl of 4 to 10 carbon atoms and alkenyl of 2 to 10 carbon atoms, Y is hydrogen or a halogen or a halogen and $X^-$ is an anion.

12. A compound according to claim 1 wherein the anion is selected from the group of Br. Cl, I and OH.

13. A compound according to claim 12 wherein R is 3-methyl-2-butenyl.

14. A compound according to claim 12 wherein R is cyclopropylmethyl.

References Cited
FOREIGN PATENTS

40/21,622   9/1965   Japan _____ 260—294.7 B

OTHER REFERENCES

Pharmaceutical Institute, School of Medicine, Tohoku University & Research Lab. Grelan Pharm. Co., Ltd., February 1969, Kametoni et al., pp. 43–48.

HENRY R. JILES, Primary Examiner

S. D. WINTERS, Assistant Examiner

U.S. Cl. X.R.

260—DIG 13, 290 HL, 297 R